United States Patent [19]
Van Cise, Jr.

[11] Patent Number: 4,679,417
[45] Date of Patent: Jul. 14, 1987

[54] TRANSMISSION SELECTOR ASSEMBLY AND LATCHING MECHANISM

[75] Inventor: Kenneth L. Van Cise, Jr., Bay City, Mich.

[73] Assignee: General Motors Corporation, Detroit, Mich.

[21] Appl. No.: 866,699

[22] Filed: May 27, 1986

[51] Int. Cl.⁴ ............................................. B60R 25/06
[52] U.S. Cl. .................................... 70/247; 74/473 R
[58] Field of Search ............... 70/247, 248; 74/473 R, 74/537, 538, 850, 878

[56] References Cited

U.S. PATENT DOCUMENTS 1,737,043  11/1929  Conlan ................................. 70/247
4,235,123  11/1980  Simancik et al. ................. 70/247 X

*Primary Examiner*—Kenneth Downey
*Attorney, Agent, or Firm*—Donald F. Scherer

[57] ABSTRACT

A console mounted transmission selector assembly has a latching mechanism which is operable to prevent the operator key from being placed in the LOCK position prior to the transmission being shifted to the desired PARK position. The latching mechanism also prevents the transmission selector lever from being shifted out of the PARK position prior to the operator key being manipulated out of the LOCK position. The selector assembly housing has the operator key disposed therein. The key mechanism and the latching mechanism are interconnected by a linkage mechanism which is also disposed within the selector assembly housing.

2 Claims, 4 Drawing Figures

4,679,417

TRANSMISSION SELECTOR ASSEMBLY AND LATCHING MECHANISM

BACKGROUND OF THE INVENTION

This invention relates to transmission selector assemblies and more particularly to such assemblies having latching mechanisms for interconnecting the transmission selector lever and the operator key mechanism.

There are a number of prior art patents such as U.S. Pat. Nos. 4,232,571 issued to Kimberlin Nov. 11, 1980, and 4,235,123 issued to Simancik et al. Nov. 25, 1980, which disclose structures for interconnecting the operator key via a cable mechanism with the transmission selector assembly.

The Kimberlin patent utilizes the cable mechanism to ground a control lever to establish a latching arrangement for the transmission shift lever. Simancik et al. utilizes the ignition cable interconnection to actuate a pin member which engages the lower end of the shift lever to provide the desired latching. These systems have been found to be effective in deterring most unauthorized persons from operating the vehicle. However, the cable members are susceptible to access by unauthorized persons who have the requisite knowledge to locate the cables. Both of these patents are directed toward automatic type transmission mechanisms.

As a general rule, countershaft or manually shifted transmissions also utilize a cable actuated latching mechanism. In manual transmissions, the latching mechanism generally consists of one or more spherical or cylindrical members which are moved into engagement with notches formed on the transmission shift rails, thus preventing manipulation of the transmission mechanism prior to manipulation of the operator key. These mechanisms are also susceptible to the same problems as those associated with automatic transmissions.

SUMMARY OF THE INVENTION

The present invention seeks to eliminate the use of latching member flexible cable operators and to provide for the complete manipulation of the latching mechanism within a single housing. This is accomplished by providing for the operator key to be mounted in the housing which also mounts the transmission shift lever. The vehicle operator key is connected by a linkage to a pivotally mounted latching plate which is positionable to restrict operation of the transmission shift lever at selected positions.

The latching mechanism can be utilized with both automatic type and manually shifted type transmissions. In manually shifted transmissions the Reverse drive position is generally selected as the PARK position. It is possible to provide a PARK position which will disable a transmission, however, the additional cost of linkages within the transmission to provide this feature are generally not warranted.

It is therefore an object of this invention to provide an improved transmission selector assembly latching mechanism wherein the selector lever is pivotally mounted in a housing and is prevented from leaving the PARK position when the operator key is in the LOCK position by a pivotable plate member which is operated through a linkage mechanism the operator key.

It is another object of this invention to provide an improved transmission selector assembly latching mechanism for a console mounted selector lever which is movable to a plurality of positions including Park and also including an operator key which is movable to a plurality of operating positions including Lock wherein a linkage mechanism cooperatively connects the operator key in a pivotally mounted latch plate which is positionable relative to the selector lever such that the selector lever must be in the PARK position before the operator key can be manipulated and the latch plate prevents the selector lever from being shifted out of the PARK position prior to the operator key being manipulated out of the LOCK position.

These and other objects and advantages of the present invention will be more apparent from the following specification and drawings.

DETAILED DESCRIPTION OF THE DRAWINGS

DESCRIPTION OF THE PREFERRED EMBODIMENT

Figure 1:
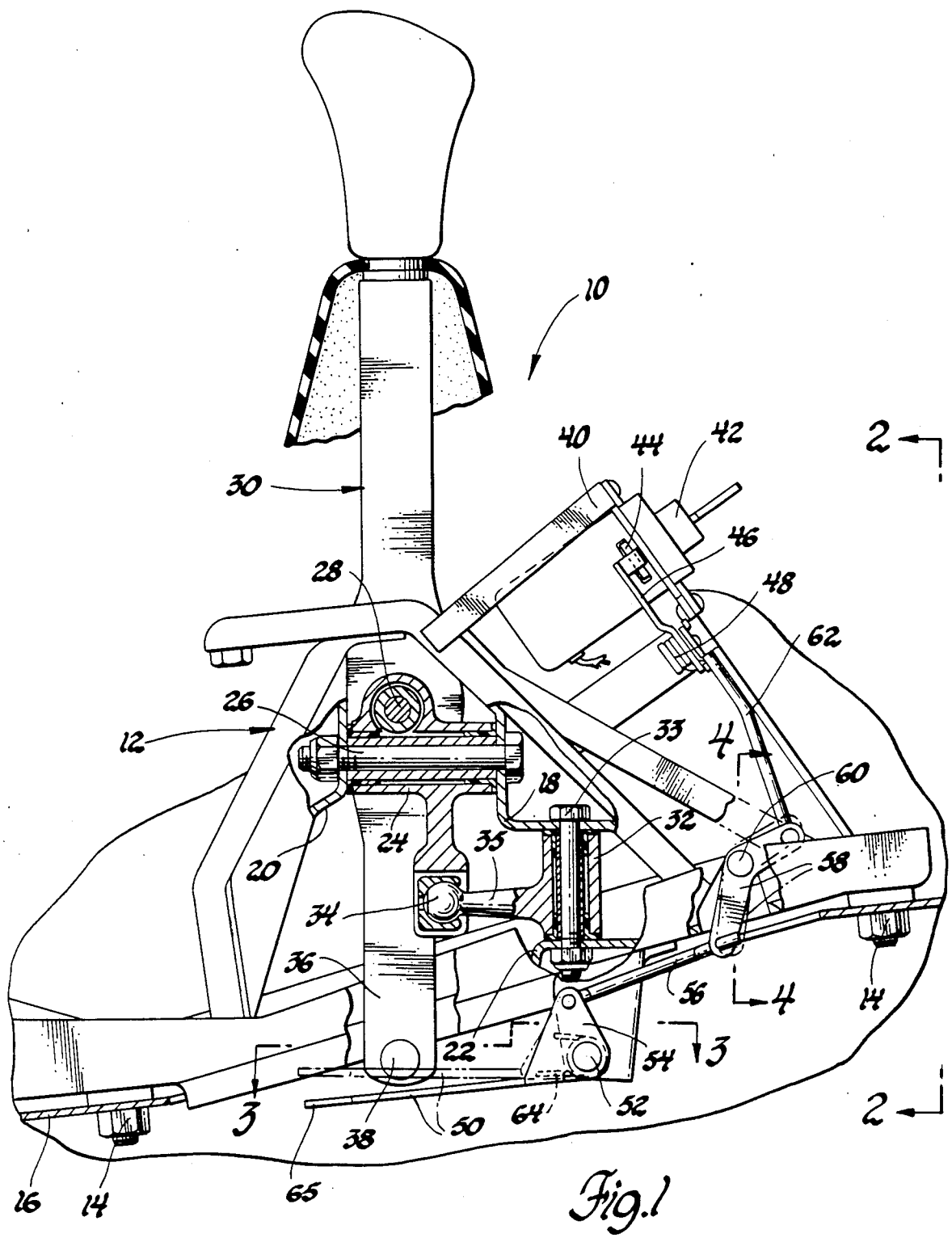
FIG. 1 is a partial sectional elevational view showing a transmission shift lever incorporating the present invention.

Referring to the drawings, wherein like characters represent the same or corresponding parts throughout the several views, there is seen in FIG. 1 a transmission selector assembly, generally designated 10, which is comprised of a housing 12 secured by a plurality of fasteners 14 to a vehicle floor panel 16. The housing 12 includes mounting portions 18, 20 and 22. The mounting portions 18 and 20 pivotally support a carrier member 24 on a bolt 26. A shift lever 30 is pivotally supported on a bolt 28 disposed in the carrier member 24. The mounting portions 18 and 22 pivotally support a stabilizer 32 on a bolt or pin 33. The stabilizer 32 is operatively connected with the carrier 24 through a ball and socket joint 34 and an arm 35. The shift lever 30 includes a lower portion 36 having an opening 38 which is adapted to be connected to a shift cable, not shown, operable to control a transmission. If desired, a ball stud can be secured in the opening 38.

With automatic type transmissions, only a single cable shift mechanism is necessary. With manual type transmissions, a second control cable is utilized. This control cable can be connected to the stabilizer 32 via an arm, not shown, which extends perpendicular from the axes of bolt 33 and arm 35. With a two cable system, one cable controls the selection for pairs of gears while the other cable controls the selection of one gear within the pair. These types of cable shift control systems are well-known such that a more complete description of their operation is not believed necessary for an understanding of the present invention.

The housing 12 also includes an operator key mounting portion 40 in which is disposed a vehicle key operating mechanism 42. This mechanism is a conventional key-operated type lock and includes a key actuated slide member 44. The slide member 44 is in abutting relation with a bellcrank 46 which in turn is spring loaded by a torsion spring 48 to be maintained in abutment with the slide member 44.

The bellcrank 46 is a member of a linkage arrangement which is responsive to the operating position of the key mechanism 42 to control a latch plate 50 which is pivotally mounted on the housing 12 by a pin member 52. The latch plate 50 has a crank arm 54 which is connected through a link 56 to a bellcrank 58 pivotally mounted on a pin 60 disposed in the housing 12. The bellcrank 58 is connected by a link 62 to the bellcrank 46.

The latch plate 50 is operatively connected with a torsion spring 64 which urges the latch plate 50 to the full line position shown in FIG. 1. The latch plate 50 is moved to the phantom line position shown in FIG. 1 through the linkage mechanism when the bellcrank 46 is in the phantom line position shown in FIG. 2. The solid line positions for bellcrank 46 and latch plate 50 in FIG. 2 are the positions they will assume when the vehicle key operating mechanism is placed in the RUN or ON position.

Figure 2:
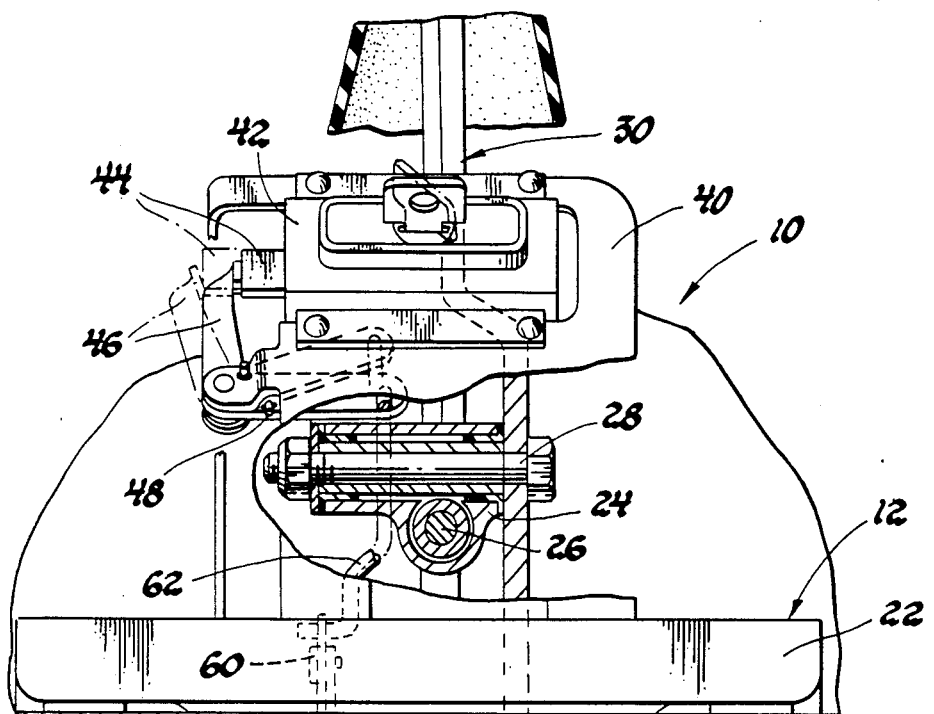
FIG. 2 is a view taken along line 2—2 of FIG. 1 with a portion of the housing removed.
Figure 4:
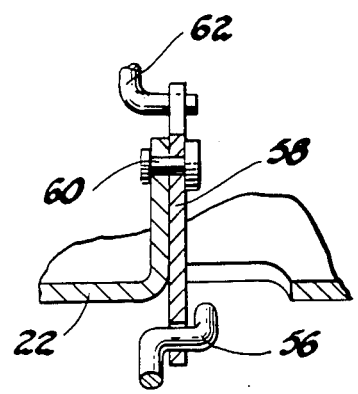
FIG. 4 is a sectional view taken along line 4—4 of FIG. 1.

The bellcrank 46 will be moved to the phantom position shown in FIG. 2 when the key operated mechanism is moved to the LOCK position. When the bellcrank 46 is moved to the phantom position, the linkage mechanism comprised of link 62, bellcrank 58, link 56 and crank arm 54 will cause the latch plate 50 to be moved to the phantom position.

Figure 3:
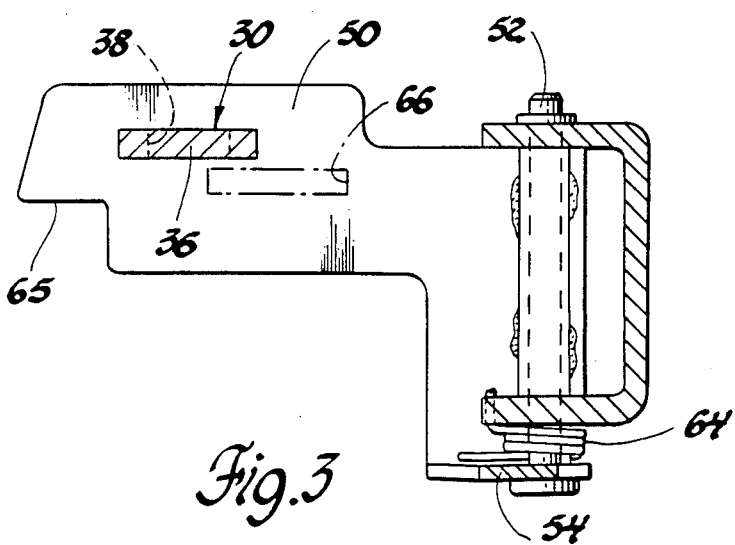
FIG. 3 is a sectional view taken along line 3—3 of FIG. 1.

As seen in FIG. 3, the latch plate 50 has a cutout portion 65 which will align with the lower portion 36 of shift lever 30 when the manual transmission is placed in the reverse position. The reverse drive position is normally selected as the parking gear position for the manual type transmission.

If desired, the latch plate 50 can have an opening as shown in phantom line at 66. This opening 66 can be made to align with the shift lever 30 when an automatic type transmission is utilized and the shift lever is disposed in or shifted to the PARK position. This will permit the use of a single latch plate with either type of transmission.

This reduces the assembly problems and parts inventory problems. However, it is possible to use a separate latch plate for each type of transmission. Unless the transmission shift lever 30 is moved to its respective PARK position, the latch plate 50 cannot be manipulated to the phantom position and accordingly the vehicle key operating mechanism cannot be manipulated to the LOCK position.

The latching mechanism therefor prevents the operator key from being removed prior to the transmission being placed in the PARK position. This reduces the likelihood that the operator will leave the vehicle with the transmission placed in some position other than PARK.

By placing the control linkage for the latch plate 50 inside of a single housing structure, the likelihood of unauthorized use of the vehicle is reduced. It is also possible to assemble the transmission shift lever mechanism, vehicle ignition key mechanism and the latching mechanism in the housing 12 prior to assembly on the vehicle. This reduces somewhat the assembly costs. It also reduces the need for a separate latching cable which might otherwise be connected between the key lock mechanism and the vehicle transmission shift mechanism.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A console mounted transmission selector mechanism including a latching mechanism comprising; a housing secured to a vehicle body member; a shift lever pivotally mounted in said housing and being pivotally manipulated to a plurality of transmission selector positions including a vehicle parking position; a vehicle key operated mechanism secured in said housing and being manipulable to LOCK, RUN and OFF positions; a latching plate pivotally mounted in said housing and including a latch opening; linkage means disposed between said key operated mechanism and said latching plate for pivoting said latching plate when said key operated mechanism is manipulated to the LOCK position; said shift lever having an extension alignable with said latch opening when said shift lever is manipulated to said vehicle parking position, said extension preventing pivoting of said latching plate by said key operated mechanism prior to said shift lever being positioned in said vehicle parking position and said latching plate being disposed directly in the pivotal path of said shift lever thereby preventing manipulation of said shift lever from said vehicle parking position if said key operated mechanism is in said LOCK position.

2. A console mounted transmission selector mechanism including a latching mechanism comprising; a housing secured to a vehicle body member; a shift lever pivotally mounted in said housing and being pivotally manipulated to a plurality of transmission selector positions including a vehicle parking position; a vehicle key operated mechanism secured in said housing and being manipulable to LOCK, RUN and OFF positions; a latching plate pivotally mounted in said housing and including a latch opening; and linkage means disposed between said key operated mechanism and said latching plate for pivoting said latching plate when said key operated mechanism is manipulated to the LOCK position, including a first bellcrank operatively connected to said vehicle key operated mechanism, a crank arm secured to said latching plate, a second bellcrank pivotally disposed on said housing, a first link connected between said first and second bellcranks and a second link connected between said second bellcrank and said crank arm, said shift lever having an extension alignable with said latch opening when said shift lever is manipulated to said vehicle parking position, said extension preventing pivoting of said latching plate by said key operated mechanism prior to said shift lever being positioned in said vehicle parking position and said latching plate preventing manipulation of said shift lever from said vehicle parking position if said key operated mechanism is in said LOCK position.

* * * * *